(12) United States Patent
Brielmann et al.

(10) Patent No.: US 9,827,944 B2
(45) Date of Patent: Nov. 28, 2017

(54) SEAT-BELT STRAP FOR A SEAT-BELT SYSTEM

(71) Applicant: CARL STAHL GMBH & CO. KG, Herbrechtingen (DE)

(72) Inventors: Roland Brielmann, Herbrechtingen (DE); Jürgen Renner, Herbechtingen (DE)

(73) Assignee: Carl Stahl GmbH & Co. KG, Herbrechtingen (DE)

( * ) Notice: Subject to any disclaimer, the term of this patent is extended or adjusted under 35 U.S.C. 154(b) by 904 days.

(21) Appl. No.: 14/350,727

(22) PCT Filed: Oct. 11, 2012

(86) PCT No.: PCT/EP2012/070116
§ 371 (c)(1),
(2) Date: Apr. 9, 2014

(87) PCT Pub. No.: WO2013/053790
PCT Pub. Date: Apr. 18, 2013

(65) Prior Publication Data
US 2014/0232165 A1    Aug. 21, 2014

(30) Foreign Application Priority Data

Oct. 12, 2011  (DE) .................. 10 2011 084 336
Feb. 21, 2012  (DE) .................. 20 2012 001 690 U

(51) Int. Cl.
*B60R 22/12*  (2006.01)
*D03D 1/00*   (2006.01)
*D03D 13/00*  (2006.01)
*D03D 5/00*   (2006.01)
*B60R 22/00*  (2006.01)

(52) U.S. Cl.
CPC .......... *B60R 22/12* (2013.01); *D03D 1/0005* (2013.01); *D03D 5/00* (2013.01); *D03D 13/00* (2013.01); *D03D 13/004* (2013.01); *B60R 2022/008* (2013.01)

(58) Field of Classification Search
CPC .... B60R 2022/008; B60R 22/12; D03D 3/00; D03D 13/004; D03D 1/0005; D03D 5/00
See application file for complete search history.

(56) References Cited

U.S. PATENT DOCUMENTS

| | | |
|---|---|---|
| 4,018,960 A | 4/1977 | Berger et al. |
| 4,174,738 A | 11/1979 | Berger et al. |
| 4,313,473 A | 2/1982 | Reiter |
| 2011/0250808 A1 | 10/2011 | Preus |

FOREIGN PATENT DOCUMENTS

| | | |
|---|---|---|
| CN | 201049991 Y | 4/2008 |
| DE | 2508732 A1 | 9/1976 |
| DE | 2719382 A1 | 11/1978 |
| DE | 2925413 A1 | 1/1981 |
| DE | 2945078 A1 | 5/1981 |
| DE | 3345508 A1 | 6/1985 |

(Continued)

*Primary Examiner* — Arti Singh-Pandey
(74) *Attorney, Agent, or Firm* — GrayRobinson, P.A.; Donald S. Showalter

(57) ABSTRACT

A seat-belt strap for a seat-belt system in a motor vehicle has a woven fabric consisting of warp threads and weft threads. The seat-belt strap is woven alternately with a 1/2 twill weave and a 2/1 twill weave across at least part of its width.

22 Claims, 2 Drawing Sheets

(56) References Cited

FOREIGN PATENT DOCUMENTS

| | | |
|---|---:|---|
| DE | 4026429 A1 | 2/1991 |
| DE | 19962919 C1 | 10/2001 |
| DE | 102004015327 A1 | 4/2005 |
| DE | 102006010775 A1 | 9/2007 |
| DE | 202008016802 U1 | 5/2009 |
| DE | 102009001545 A1 | 9/2010 |
| DE | 102009002869 A1 | 11/2010 |
| DE | 102009024044 A1 | 12/2010 |
| DE | 102009058039 B3 | 5/2011 |
| EP | 0021104 A1 | 1/1981 |
| EP | 0350169 A1 | 1/1990 |
| GB | 2235703 A | 3/1991 |
| JP | 3-273960 A | 12/1991 |

SEAT-BELT STRAP FOR A SEAT-BELT SYSTEM

CROSS-REFERENCE TO RELATED APPLICATIONS

This application claims priority under 35 U.S.C. Sections 119(a)-(d), 120, 363 and 365 to International Patent Application No. PCT/EP2012/070116, filed Oct. 11, 2012 which designated the United States and at least one other country in addition to the United States and claimed priority to German Application No. 10 2011 084 336.1 filed Oct. 12, 2011 and German Utility Model Application No. 20 2012 001 690.3 filed Feb. 21, 2012. International Patent Application No. PCT/EP2012/070116, and German Patent Application No. 10 2011 084 336.1 and German Utility Model Application No. 20 2012 001 690.3 are each expressly incorporated by reference herein in their entirety to form a part of the present disclosure.

FIELD OF THE INVENTION

The invention relates to a seat-belt strap for a seat-belt system of a motor vehicle, comprising a fabric woven from warp threads and weft threads. The invention further relates to a method of forming a seat-belt strap.

BACKGROUND OF THE INVENTION

A seat-belt strap of the type in question is known from JP3273960A. This seat-belt strap can have a woven construction in a 1/2 twill weave, in which case acrylic threads are used in order that certain visual effects may be achieved. Since acrylic does not have the strength values of the materials typically used for seat-belt straps, it is only used in a proportion of about 2%. The deployment of threads of comparatively low strength in the field of restraint systems must be considered problematic in principle.

A further seat-belt strap is known from EP 0 350 169 B1. In order to produce a colored weave construction, a 2/2 twill weave consisting of four warp-thread phases is used as basic construction and one or more warp-thread phases are omitted to form an uneven weave pattern on the surface of the belt.

DE 20 2008 016 802 U1 describes a belt for use as vehicle seat belt having a woven structure consisting of warp and weft threads, wherein at least in a lengthwise portion of the belt the weft threads are formed such that they can extend in length in comparison with the warp threads.

A further seat-belt strap for seat belts is described in DE 10 2009 001 545 A1. The woven fabric here has a construction with ribs which extend in the transverse direction of the seat-belt strap and which form a parallel arrangement in the longitudinal direction of the seat-belt strap.

DE 10 2009 024 044 A1 describes a seat-belt strap comprising a plain-woven construction having between 200 and 350, in particular between 245 and 305 warp threads whose thread linear density is between 1000 and 1200 dtex.

A belt formed from a plurality of warp threads and at least one weft thread and wherein successive picks of the weft thread each loop around a different warp thread in the edge region is described in DE 10 2004 015 327 A1.

DE 10 2009 058 039 B3 discloses a further seat-belt strap comprising a plurality of warp threads, a weft thread and a catch thread passing through the loops of the weft thread, placed between the warp threads and covered by the weft thread and/or the warp threads toward the surface of the seat-belt strap.

DE 10 2006 010 775 A1 discloses a seat-belt strap having an inner region, a soft right-hand edge region and a soft left-hand edge region and also a right-hand weft thread and a left-hand weft thread, wherein the right-hand weft thread is only in the inner region and in the right-hand edge region and the left-hand weft thread is only in the inner region and in the left-hand edge region.

DE 199 62 919 C1 describes a seat-belt strap and a method of forming it by using a monofil weft thread for the seat-belt strap.

DE 10 2009 002 869 A1 describes a further method of forming seat-belt straps and also a seat-belt strap thus obtained.

These known seat-belt straps are disadvantageous in some instances in that they may become wavy because of friction.

Seat-belt straps with so-called hollow selvages are described in DE 27 19 382 A1, DE 29 25 413 A1, DE 29 45 078 A1 or EP 0 021 104 A1. Similar prior art is additionally shown by DE 33 45 508 C2.

However, these known seat-belt straps with hollow selvages have the disadvantage that such a hollow selvage is very tricky to form, which is why the manufacturing costs of these known seat-belt straps are comparatively high. In order to meet the desired standards expected of the softness and, in particular, the scuff resistance of the selvage region of these seat-belt straps, they are in some instances also treated with various additives such as polyacrylates, polyethylenes, silicones or the like, which further increases the production costs.

SUMMARY OF THE INVENTION

It is an object of the present invention to devise a seat-belt strap for a seat-belt system of a motor vehicle that has a longer service life with regard to scuff resistance.

This object is achieved according to the present invention by the features recited in claim 1.

The use of a 1/2 twill weave and of a 2/1 twill weave, i.e., of a three-ended twill weave, for the woven fabric of the seat-belt strap according to the present invention—as opposed to a 2/2 twill weave, i.e., a four-ended twill weave—provides for a distinct increase in the number of interlacing points within the woven fabric and hence in the strength of the woven fabric. This provides improved frictional characteristics, better scuff resistance and hence a lesser proneness to waviness and flabbiness on the part of the seat-belt strap according to the present invention, leading to a longer service life thereof and hence to a lower number of likely complaints. There is also a distinct decrease in the proneness to distortions as a result of the improved scuff resistance on the part of the woven fabric.

The improved robustness also results in an appreciable reduction in possible deterioration of the seat-belt strap according to the present invention, leading to an extended service life—a basic requirement in the engineering of seat-belt straps.

To achieve a seat-belt strap having the same properties as those of a prior art seat-belt strap, however, the number of weft threads used can be reduced, so the seat-belt strap is obtainable with the same quality as known seat-belt straps, but with a lower weight and—inter alia through the saving of wage and material costs—at lower cost.

In order that similar scuff resistance may be achieved on both sides of the seat-belt strap according to the present invention, it can be provided according to the present invention that the alternation of 1/2 twill weave and 2/1 twill weave is provided at least in a central region of the seat-belt strap.

In a particularly advantageous embodiment, the alternation of 1/2 twill weave and 2/1 twill weave is provided across the full width of the seat-belt strap, since this ensures that the entire seat-belt strap has the abovementioned advantages.

Since seat-belt straps for seat-belt systems also have to meet particular esthetic requirements because of their direct visibility within the motor vehicle, it is particularly advantageous for the 1/2 twill weave and the 2/1 twill weave to alternate after a specified number of repeats. This makes it possible to meet the vehicle industry expectations of the visual properties of the seat-belt strap in the desired manner across the width of the seat-belt strap, while ensuring that both sides of the seat-belt strap have substantially the same technical properties, in particular regarding scuff resistance.

Alternation between the 1/2 twill weave and the 2/1 twill weave after every repeat results in a particularly high scuff resistance and uniformity across the width of the seat-belt strap.

It is particularly advantageous in this connection for each repeat to include three or more warp threads.

In a further very advantageous embodiment of the invention, moreover, the 1/2 twill weave and the 2/1 twill weave alternate after every warp thread. An embodiment of this type provides high symmetry and good scuff resistance.

It is particularly advantageous in this connection for each repeat to include six or more warp threads.

In order that the appearance of the seat-belt strap according to the present invention can additionally be influenced, it can further be provided in an advantageous embodiment of the invention that the woven construction is such that the course of the twill line changes after a specified number of repeats.

In addition to the above-detailed change in the interlacing of the warp threads, it can also be provided that the interlacing of the weft threads changes at specified intervals in the longitudinal direction of the seat-belt strap. An approach of this type can be used to achieve virtually any properties regarding the appearance of the surface and the scuff resistance of the seat-belt strap.

In a possible further very advantageous embodiment of the invention, in the direction perpendicular to its longitudinal direction the seat-belt strap has one central region and two outlying selvage regions, wherein the woven construction of either or both of the selvage regions comprises a 1/2 twill weave and a 2/1 twill weave.

The use of a 1/2 twill weave and of a 2/1 twill weave, i.e., of a three-ended twill weave, in either or both of the selvage regions of the seat-belt strap according to the present invention—as opposed to the use of a 2/2 twill weave or of a 1/1 hollow weave, i.e., of a four-ended weave—provides for a distinct increase in the number of interlacing points within the woven fabric and hence in the strength of the woven fabric. As a result, better scuff resistance and hence lesser proneness to broken filaments can be achieved in the selvage region concerned, leading to an extended service life on the part of the seat-belt strap according to the present invention and hence to a lower number of likely complaints. It was found in practical tests that executing the selvage region in the manner of the present invention contributes to an appreciable improvement in the scuff resistance thereof.

This qualitative improvement in the selvage region of the seat-belt strap is advantageously even more straightforwardly realizable than known high-value solutions, so a larger amount of the seat-belt strap according to the present invention can be produced per unit time than of these known high-value solutions. As a result, the seat-belt strap according to the present invention is less costly to manufacture than these known high-value seat-belt straps. The seat-belt strap of the present invention can thus be manufactured at lower cost, and in higher quality, than high-value solutions at least.

In a further advantageous embodiment of the invention, the woven construction of the central region of the seat-belt strap comprises a construction other than a 1/2 twill weave and other than a 2/1 twill weave. In this embodiment, the type of construction employed in the central region of the woven fabric of the seat-belt strap plays a minor part, this being of particular advantage when, for example, any one automotive manufacturer is desirous of a particular type of construction.

It can further be provided that the woven construction of the central region of the seat-belt strap is a 2/2 twill weave. Such a 2/2 twill weave is the type of construction which is mandated by many automotive manufacturers and therefore widely used in seat-belt straps for seat-belt systems. A very advantageous aspect is that this type of construction is readily combinable with the type of construction which, according to the invention, is employed in the selvage region.

In a very advantageous embodiment of the invention, the at least one selvage region has an inner portion and an outer portion perpendicularly to the longitudinal direction of the seat-belt strap, the woven fabric has two mutually concurrently inserted weft threads, one of the pair of weft threads extends not only through the inner portion but also through the outer portion, and the other one of the pair of weft threads only extends through the inner portion and not through the outer portion. The use according to the present invention of two weft threads, only one of which passes through the outer portion of the at least one selvage region, results in this outer portion in a lower ratio of weft threads to warp threads and hence also in a lower number of interlacing points, which results in a very good level of softness on the part of the selvage region thus formed. This improved softness on the part of the selvage region leads to a very good level of wearing comfort for the seat-belt strap according to the present invention, which may even exceed that of existing solutions that utilize a hollow selvage. Particular emphasis must be given here to the very much lower fabrication requirements compared with existing high-value solutions.

In one possible embodiment of the invention, an embodiment which is very simple to realize, the two concurrently inserted weft threads have at least approximately the same yarn fineness.

Alternatively, however, it is also possible for the weft thread, which extends not only through the inner portion but also through the outer portion, to have a lower yarn fineness than the weft thread, which only extends through the inner portion and not through the outer portion. Using a lower yarn fineness for the weft thread extending not only through the inner portion but also through the outer portion is a way to further increase the softness of the outer portion of the selvage region. Any desired combinations are possible here in principle, making it possible to meet the various requirements on the part of the manufacturers and/or users of seat-belt systems.

In order to influence the technical properties of the seat-belt strap, one embodiment may further provide that the weft threads consist of materials having different properties.

In order that the softness of the selvage region may be increased still further, a further advantageous embodiment of the invention may provide that the warp threads in either or both of the selvage regions have a lower yarn fineness than the warp threads in the central region.

In an embodiment which is particularly advantageous with regard to the softness of the selvage region of the seat-belt strap according to the present invention, the yarn fineness of the warp threads in either or both of the selvage regions is two or more times lower than the yarn fineness of the warp threads in the central region.

In a possible further advantageous embodiment of the invention, an alternation of 1/2 twill weave and 2/1 twill weave is provided across the width of the at least one selvage region. Such an alternation between the 1/2 and the 2/1 twill weave results in a similar scuff resistance at both selvage regions of the seat-belt strap according to the present invention.

It may be provided in particular that the 1/2 twill weave and the 2/1 twill weave alternate after every warp thread. Such an alternation between the 1/2 and the 2/1 twill weave after every warp thread leads to a particularly high level of symmetry for the selvage region thus formed.

A method of forming a seat-belt strap according to the present invention is apparent from the features of claim 22.

This method is a particularly simple, efficient and cost-effective way to form the seat-belt strap of the present invention while achieving the advantages described above.

Illustrative examples of the invention will now be described in principle with reference to the drawings, where

DETAILED DESCRIPTION

Figure 1:
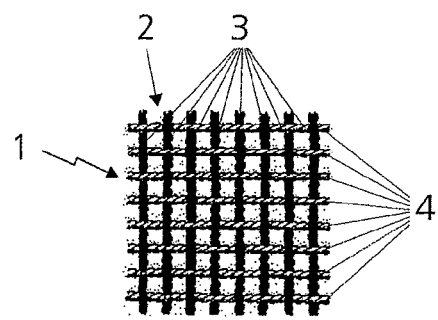
FIG. 1 shows a schematic depiction of a seat-belt strap.

FIG. 1 is a highly schematic view of a seat-belt strap 1 for a seat-belt system which is not depicted in its entirety and which is suitable for a motor vehicle for example. The seat-belt strap 1 comprises a woven fabric 2 which consists, as will be known per se, of warp threads 3 and weft threads 4, which in the present case form a plain-woven construction merely by way of example. The weft threads 4 are in principle at least one weft thread which reverses its direction each time at the edge of woven fabric 2. Nonetheless, as is customary with woven fabrics, the reference hereinbelow will be to weft threads 4.

FIGS. 2, 3, 4 and 5 depict weave pattern diagrams for woven fabric 2 of seat-belt strap 1. As usual, a filled square indicates that the warp thread 3 passes over the weft thread 4, while a blank square indicates that the weft thread 4 passes over the warp thread 3. Transposition of this weave pattern diagram into a program for controlling the weaving machine can be accomplished in the usual manner and therefore will not be described here in further detail.

The seat-belt straps 1 depicted in FIGS. 2-5 all share the feature that their woven construction alternates between a 1/2 twill weave and a 2/1 twill weave. Especially these embodiments of the seat-belt strap 1 offer the abovementioned advantages regarding improved frictional characteristics, better scuff resistance and lower susceptibility to waviness and flabbiness. As a result, an extended service life can be achieved for seat-belt strap 1. In addition, the possibly simpler production makes it possible to save material and fabrication costs.

Figure 2:
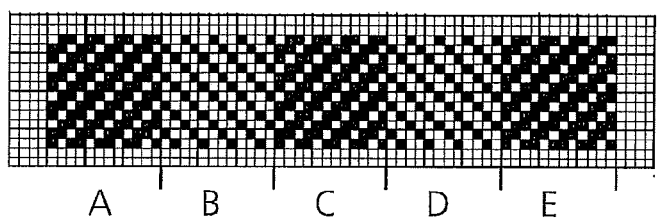
FIG. 2 shows a weave pattern diagram for a first embodiment of a seat-belt strap.

FIG. 2 depicts an example of a first embodiment of the seat-belt strap 1 wherein the 1/2 twill weave and the 2/1 twill weave alternate after a specified number of repeats, in the present case after four repeats. As will be known, a repeat denotes the number of threads necessary to make the basic unit of a weave, i.e., the smallest number of warp and weft threads after which the pattern of interlacings repeats. In the illustrative example depicted in FIG. 2 each repeat has three warp threads 3. Following the first twelve warp threads 3, i.e., after four repeats, the weave changes from a 2/1 twill weave to a 1/2 twill weave. Therefore, in the region denoted "A", where the woven fabric 2 has the 2/1 twill weave, there will be a greater number of warp threads 3 at the surface of the seat-belt strap 1 than in the "B" region, which follows on from the "A" region and where a 1/2 twill weave is provided. Altogether, five regions A, B, C, D and E are provided in the present case, with a 2/1 twill weave being provided in regions A, C and E and a 1/2 twill weave in regions B and D. This embodiment leads to stripes extending in the longitudinal direction across the seat-belt strap 1, making it possible to endow the seat-belt strap 1 with a design which is very similar to the design of known seat-belt straps intended for seat-belt systems, yet constructed with a 2/2 twill weave. This makes it possible to achieve a higher level of acceptance for the seat-belt strap 1.

In the present case, therefore, there are five stripes across the width of the seat-belt strap 1 and the number of warp threads 3 interlacing in a 1/2 twill weave is less than the number of warp threads 3 interlacing in a 2/1 twill weave. It will be appreciated that it would also be possible to provide a different number of stripes and/or a different width for the stripes across the width of the seat-belt strap 1. It would also be possible to provide an embodiment here wherein, across the width of the seat-belt strap 1, the number of warp threads 3 interlacing in a 1/2 twill weave corresponds to the number of the warp threads 3 interlacing in a 2/1 twill weave.

There is further an undepicted embodiment wherein the 1/2 twill weave and the 2/1 twill weave could also alternate after every repeat, i.e., the smallest number of warp and weft threads necessary to make the basic unit of the woven construction.

Figure 3:
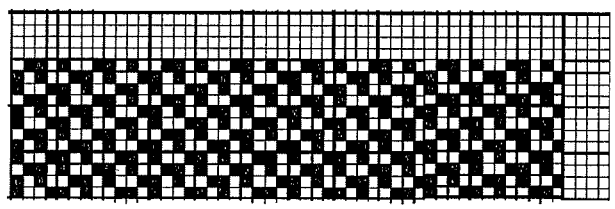
FIG. 3 shows a weave pattern diagram for a further embodiment of a seat-belt strap.

FIG. 3 depicts an embodiment of an exemplary weave pattern diagram for woven fabric 2 of seat-belt strap 1, wherein the 1/2 twill weave and the 2/1 twill weave alternate after each and every warp thread 3. Viewed from the left-hand edge, the first warp thread 3 interlaces in a 2/1 twill weave and the second warp thread 3 in a 1/2 twill weave. The third warp thread 3 is then interlaced again in a 2/1 twill weave and the fourth warp thread 3 in a 1/2 twill weave, and this continues across the width of seat-belt strap 1. It is apparent that the repeat in this case numbers six warp threads 3, i.e., that the interlacing pattern is repeated after six warp threads 3. This frequent change in the type of construction endows the woven fabric 2 obtained as per the woven pattern diagram depicted in FIG. 3 with a very uniform surface, which is essentially the same on the two sides of seat-belt strap 1. Preferably, across the width of seat-belt strap 1, the number of warp threads 3 interlacing in a 1/2 twill weave is essentially equal to the number of warp threads 3 interlacing in a 2/1 twill weave, as a result of which the two sides of seat-belt strap 1 have essentially the same technical properties.

Figure 4:
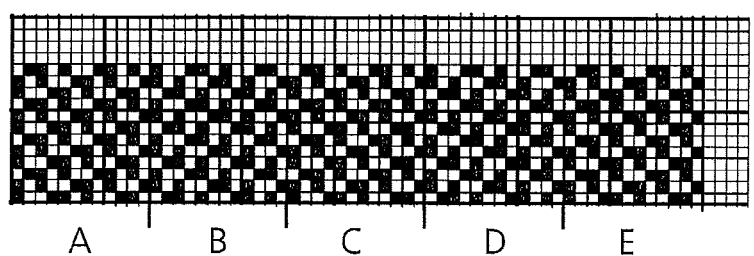
FIG. 4 shows a weave pattern diagram for a further embodiment of a seat-belt strap.

The weave pattern diagram shown in FIG. 4 is very similar to that shown in FIG. 3. Again, the 1/2 twill weave and 2/1 twill weave alternate after every warp thread 3. Whereas, however, the seat-belt strap 1 of FIG. 3 has no stripes in the longitudinal direction, the twill line alters/changes to confer a specified level of stripiness on woven fabric 2. Again, the stripes extending across the width of seat-belt strap 1 are designed A, B, C, D and E, with stripes A, C and E displaying a so-called Z-twill and strips B and D an S-twill. This alteration in the course of the twill is achieved by displacing the particular first warp thread 3 of stripes B and D downwardly by two weft threads 4. The next warp thread 3, i.e., the second warp thread 3, in the "B" stripe then follows in the usual manner such that two adjacent warp threads 3 do not interlace in the same way. It is also advantageous for the next warp thread 3 to be displaced "correctly" to achieve very firm interlacing.

Figure 5:
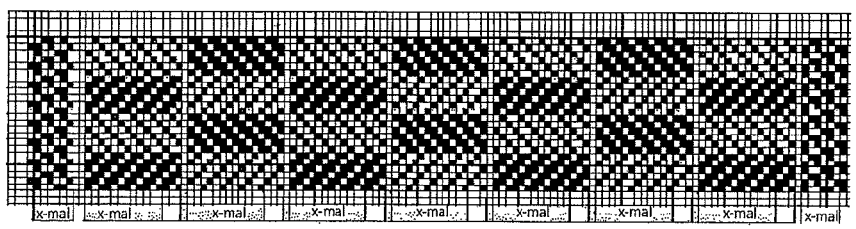
FIG. 5 shows a weave pattern diagram for a further embodiment of a seat-belt strap.

In the weave pattern diagram depicted in FIG. 5 for the fourth embodiment of seat-belt strap 1, the interlacing of weft threads 4 changes in the longitudinal direction of woven fabric 2 as well as the interlacing of warp threads 3. Whereas the type of construction changes after altogether five repeats and hence at three warp threads 3 per repeat and after fifteen warp threads 3, the interlacing of weft threads changes after altogether six weft threads 4. As a result, seat-belt strap 1 acquires a diamond pattern. It will be appreciated that such a diamond pattern of seat-belt strap 1 would also be possible in other sizes provided the type of construction changes after a different number of warp threads 3 and/or weft threads 4. In the weave pattern diagram depicted in FIG. 5, an empty column was inserted for clarity between partial repeats in each case. FIG. 5 further reveals that the selvage regions of seat-belt strap 1 are constructed differently than the central region thereof, viz., with the alternating 1/2 and 2/1 twill weaves elucidated above, for example with reference to FIG. 2.

Other combinations of 1/2 twill weave with 2/1 twill weave across the width and length of seat-belt strap 1 can thus be used to achieve various designs.

With all the embodiments described herein, a warp thread 3 is displaced upwardly relative to the particular adjacent warp thread 3 in order that the oblique twill line may be achieved.

Figure 6:
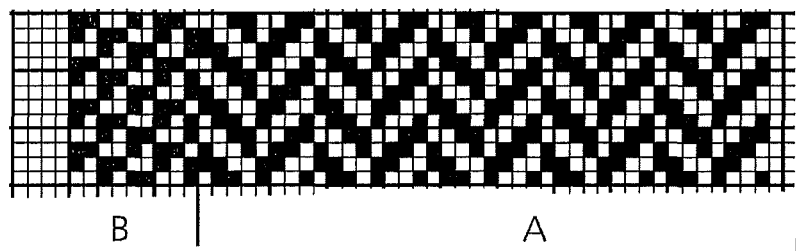
FIG. 6 shows a weave pattern diagram for a further embodiment of the inventive seat-belt strap.
Figure 7:
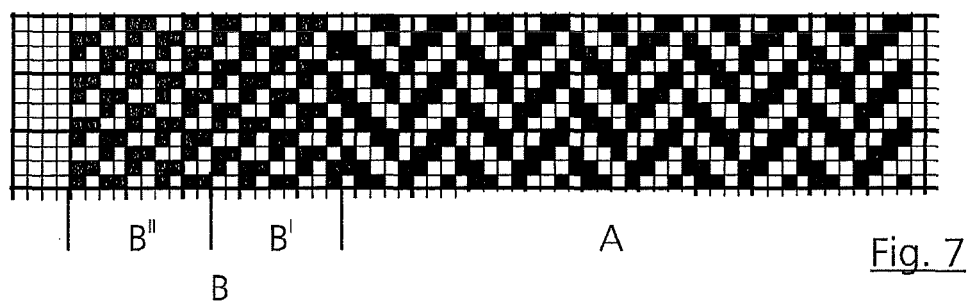
FIG. 7 shows a weave pattern diagram for a further embodiment of the inventive seat-belt strap.
Figure 8:
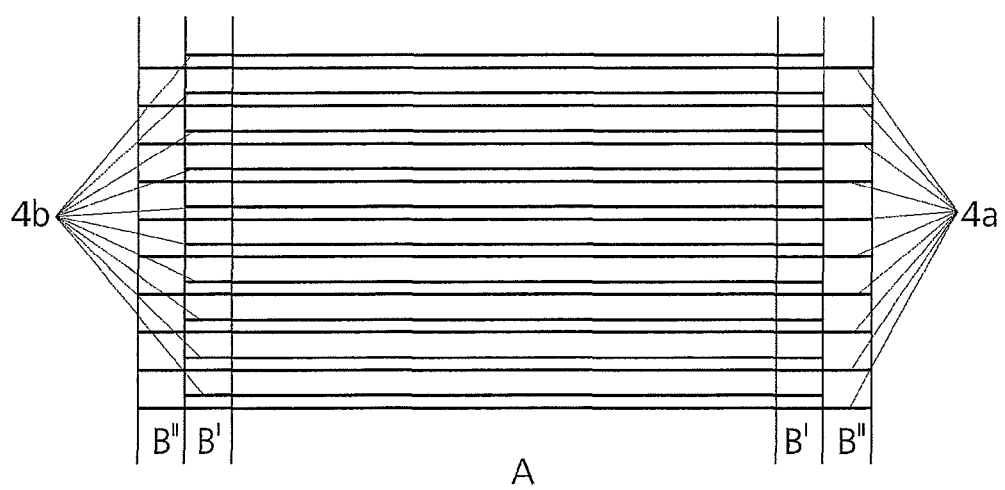
FIG. 8 shows a schematic depiction of the seat-belt strap from FIG. 7.

FIGS. 6, 7 and 8 show various embodiments of seat-belt strap 1 according to the present invention by means of two weave pattern diagrams and one highly schematic depiction.

In the weave pattern diagram of FIG. 6, the seat-belt strap 1 is subdivided into a central region A and two selvage regions B adjoining laterally to the central region A. For clarity, the seat-belt strap 1 is not depicted across its full width in FIGS. 6 and 7, so only one of selvage regions B, namely that which is on the left-hand side of seat-belt strap 1, is visible.

The other selvage region B, on the right-hand side of seat-belt strap 1, can in principle be constructed identically to the depicted selvage region B. Since seat-belt strap 1 is only depicted across a short portion of its length, it should further be noted that seat-belt strap 1 is preferably constructed across its full length similarly to the portion thereof which is depicted in FIG. 6.

In FIG. 6, it is apparent that selvage region B is constructed with a 1/2 twill weave and a 2/1 twill weave. Preferably, the two selvage regions B have a mutually identical construction, since this is best for developing the advantages adduced above. In principle, however, it is also possible to construct only one of selvage regions B in a 1/2 twill weave and a 2/1 twill weave and to construct the other selvage region in some other way.

FIG. 6 further reveals that the 1/2 twill weave and the 2/1 twill weave alternate across the width of selvage region B. In the present case, the 1/2 twill weave and the 2/1 twill weave alternate after every warp thread 3, leading to a very uniform appearance and a very uniform surface for seat-belt strap 1. Theoretically, however, it would also be possible to interlace a plurality of adjacent warp threads 3 in a 1/2 twill weave and subsequently a plurality of adjacent warp threads 3 in a 2/1 twill weave.

FIG. 6 further reveals that the central region A of woven fabric 2 has a 2/2 twill weave construction. It would also be possible, in principle, to weave the central region A of woven fabric 2 in a construction other than a 1/2 twill weave or a 2/1 twill weave, for example in a plain-woven construction.

Whereas, in the embodiment of FIG. 6, the two selvage regions B merely have one portion perpendicularly to the longitudinal direction of seat-belt strap 1 that is constructed in a 1/2 twill weave and a 2/1 twill weave, selvage regions B as per the embodiment of FIG. 7 each have, perpendicularly to the longitudinal direction of seat-belt strap 1, an inner portion B' and an outer portion B". The 1/2 and 2/1 twill weaves are again provided in both portions B' and B" of selvage region B and preferably again alternate after every warp thread 3. As is apparent from the highly schematicized depiction of FIG. 8, where the warp threads 3 are not depicted for simplicity, however, woven fabric 2 has two weft threads 4a and 4b inserted each time simultaneously, i.e., with two weft needles not depicted, to replace the single weft thread in the embodiment of FIG. 6. This has no repercussions whatsoever for the central region A of woven fabric 1 in that, in particular, the same strength can be achieved with two weft threads 4a and 4b as with the single weft thread 4. As far as selvage regions B are concerned, however, it is provided that one of the two weft threads, namely weft thread 4a in the present case, shall extend not only through the inner portion B' but also through the outer portion B", whereas the other weft thread 4b only extends through the inner portion B' and not through the outer portion B". This reduces the weft content in the outer portion B", as a result of which woven fabric 2 is appreciably softer in the outer portion B" or in the outer portions B", i.e., the end portions of the two selvage regions B, than in the central region A and also softer than in the inner portions B' of selvage regions B. In other words, this ratio of weft threads 4 and warp threads 3 in the outer portions B" bestows lower hardness on woven fabric 2 in this region.

The two weft threads 4a and 4b can be simultaneously inserted by the two weft needles from one side of seat-belt strap 1 in parallel. Alternatively, the two weft threads 4a and 4b can be simultaneously inserted from two opposite sides by two contrary weft needles.

In a further possible embodiment, the two concurrently inserted weft threads 4a, 4b have at least approximately the same yarn fineness. However, it is also possible to construct the weft thread 4a, which extends across the full width of woven fabric 2, in a lower yarn fineness than weft thread 4b, which extends exclusively through the inner portion B' and not through the outer portion B". It is optionally also possible to construct the weft thread 4a, which extends across the full width of woven fabric 2, in a higher yarn fineness than weft thread 4b, which extends exclusively through the inner portion B' and not through the outer portion B".

It may be mentioned merely by way of example that, given an assumed yarn fineness of 1100 dtex for weft thread 4 of FIG. 6, the two weft threads 4a and 4b as per FIGS. 7 and 8 can each have a yarn fineness of 550 dtex. It is alternatively possible for example to construct weft thread 4a to be of 400 dtex and weft thread 4b to be of 700 dtex. However, completely other combinations of the yarn finenesses of the two weft threads 4a and 4b are also possible.

The yarn fineness for the two weft threads 4a and 4b is thus preferably chosen such that its addition is equal to the overall fineness of the single weft thread 4 otherwise used, completely forestalling any concern about the strength of seat-belt strap 1.

Save that two weft needles are required to insert the two weft threads 4a and 4b, it is unimportant for woven fabric 2 whether the single weft thread 4 or the two weft threads 4a and 4b are provided as long as the yarn fineness thereof is chosen such that the sum total of the yarn finenesses of weft threads 4a and 4b as per FIGS. 7 and 8 is equal to the yarn fineness of weft thread 4 as per FIG. 6.

The two weft threads 4a and 4b may consist of the same material. However, it is also possible to use materials having different properties for weft threads 4a and 4b.

In one undepicted embodiment, weft thread 4a for example can be made of a yarn which responds to heat by shrinking and thus pulling selvage region B more closely in the direction of central region A of woven fabric 2.

In the embodiments of seat-belt strap 1 as per FIGS. 6, 7 and 8, therefore, selvage regions B are constructed differently than central region A, so selvage regions B acquire different properties than central region A.

In the two embodiments of woven fabric 2 as per FIG. 6 and as per FIGS. 7 and 8, respectively, the warp threads 3 in either or both of the selvage regions B have a lower yarn fineness than the warp threads 3 in the central region A. This results in additional softness for selvage regions B. In a particular embodiment in this connection, the yarn fineness of the warp threads 3 in either or both of the selvage regions B is two or more times lower than the yarn fineness of the warp threads 3 in the central region A. For example, warp threads 3 in central region A can be constructed in a yarn fineness of 1100 dtex or 1670 dtex and warp threads 3 in selvage regions B in a yarn fineness of 550 dtex. The selection of warp threads 3 in selvage regions B can also take account of technical properties of the yarn, for example elongation at break, breaking load, filament number, twists per meter and thermal shrinkage characteristics. It is also possible in this case to employ a larger number of threads in either of selvage regions B or in both selvage regions B than in central region A. This may possibly result in the achievement of superior rubfastness and/or a higher level of scuff resistance. Using a larger number of finer yarns as opposed to a smaller number of thicker yarns increases the number of interlacing points.

It is similarly conceivable to employ materials having different stretch characteristics in either of selvage regions B or in both selvage regions B, in particular a higher stretch than in central region A. These different yarn finenesses and/or materials in selvage regions B can be used to take account of the fact that what may matter in selvage regions B, depending on the use scenario, is not a higher breaking load but precisely a better level of frictional properties.

The width of the two selvage regions B can be about 1 to 4 mm in all the embodiments depicted in FIGS. 6, 7 and 8. In the illustrative example depicted in FIG. 6, selvage region B comprises nine warp threads 3, whereas in the illustrative example depicted in FIG. 7 the inner portion B' comprises nine and the outer portion B" of selvage region B comprises ten warp threads 3. However, these particulars are to be understood as purely exemplary and can depend on a wide variety of factors, and change accordingly. Similarly, the size of the two portions B' and B" in FIG. 7 and in FIG. 8 must be regarded as purely exemplary in that, in certain use scenarios, it may be sensible to make either inner portion B' or outer portion B" larger than whichever is the other portion, B" or B'.

The seat-belt strap 1 in the present illustrative examples has a symmetrical construction with regard to its longitudinal axis. However, this is not an absolute requirement. More particularly, it is also possible to construct one of the two selvage regions B using existing solutions. In this context, it would also be possible for one of the two selvage regions B to be meshed off by means of an undepicted auxiliary thread such that the requisite softness and scuff resistance is achieved.

Alternatively to the embodiments depicted in FIGS. 6 to 8, the side edges or selvages of seat-belt strap 1 can also be constructed irrespective of the type of weave, in a conventional manner, i.e., not in the manner described herein with reference to the manner described in FIGS. 6 to 8.

The seat-belt strap embodiment depicted in FIGS. 2 to 5 may also utilize for example a so-called Rukaflex selvage, a rep selvage, a hollow selvage, a half-hollow selvage or a three-quarters hollow selvage. Since these embodiments of selvages are known to a person skilled in the art, they are not further elucidated herein.

It is further possible to use different yarn finenesses in the selvage regions irrespective of the type of weave used. For example, thinner yarns can be used in the selvage regions than in the central region.

The embodiments and combinations described herein provide the basis for various possible designs of seat-belt strap 1.

While the foregoing constitute preferred embodiments of the invention according to the best mode presently contemplated by the inventors of making and carrying out the invention, it is to be understood that the invention is not limited to the particulars described above. In light of the present disclosure, various alternative embodiments and modifications will be apparent to those skilled in the art. Accordingly, it is to be recognized that changes can be made without departing from the scope of the invention has particularly pointed out and distinctly claimed in the appended claims as properly construed to include all legal equivalents.

What is claimed is:

1. A seat-belt strap for a seat-belt system of a motor vehicle, comprising:
   (a) a fabric woven from warp threads and weft threads, wherein the woven construction of the seat-belt strap alternates across at least part of its width between a 1/2 twill weave and a 2/1 twill weave.

2. The seat-belt strap as claimed in claim 1, wherein the 1/2 twill weave and 2/1 twill weave alternates in at least in a central region of the seat-belt strap.

3. The seat-belt strap as claimed in claim 2, wherein the 1/2 twill weave and 2/1 twill weave alternates across the full width of the seat-belt strap.

4. The seat-belt strap as claimed in claim 1, wherein the 1/2 twill weave and the 2/1 twill weave alternate after a specified number of repeats.

5. The seat-belt strap as claimed in claim 4, wherein each repeat includes three or more warp threads.

6. The seat-belt strap as claimed in claim 1 wherein the 1/2 twill weave and the 2/1 twill weave alternate after every repeat.

7. The seat-belt strap as claimed in claim 1, wherein the 1/2 twill weave and the 2/1 twill weave alternate after every warp thread.

8. The seat-belt strap as claimed in claim 7, wherein each repeat includes six or more warp threads.

9. The seat-belt strap as claimed in claim 1, wherein the woven construction is such that the course of the twill line changes after a specified number of repeats.

10. The seat-belt strap as claimed in claim 1, wherein the interlacing of the weft threads changes at specified intervals in the longitudinal direction of the seat-belt strap.

11. The seat-belt strap as claimed in claim 1, wherein the direction perpendicular to its longitudinal direction the seat-belt strap has one central region and two outlying selvage regions, wherein the woven construction of either or both of the selvage regions comprises a 1/2 twill weave and a 2/1 twill weave.

12. The seat-belt strap as claimed in claim 11, wherein the woven construction of the central region of the seat-belt strap comprises a construction other than a 1/2 twill weave and other than a 2/1 twill weave.

13. The seat-belt strap as claimed in claim 12, wherein the woven construction of the central region of the seat-belt strap is a 2/2 twill weave.

14. The seat-belt strap as claimed in claim 11, wherein the at least one selvage region has an inner portion and an outer portion perpendicularly to the longitudinal direction of the seat-belt strap, in that the woven fabric has two mutually concurrently inserted weft threads, in that one of the pair of weft threads extends not only through the inner portion but also through the outer portion, and in that the other one of the pair of weft threads only extends through the inner portion and not through the outer portion.

15. The seat-belt strap as claimed in claim 14, wherein the two concurrently inserted weft threads have at least approximately the same yarn fineness.

16. The seat-belt strap as claimed in claim 14, wherein the weft thread, which extends not only through the inner portion but also through the outer portion, has a lower yarn fineness than the weft thread, which only extends through the inner portion and not through the outer portion.

17. The seat-belt strap as claimed in claim 14, wherein the weft threads consist of materials having different properties.

18. The seat-belt strap as claimed in claim 11, wherein the warp threads in either or both of the selvage regions have a lower yarn fineness than the warp threads in the central region.

19. The seat-belt strap as claimed in claim 18, wherein the yarn fineness of the warp threads in either or both of the selvage regions is two or more times lower than the yarn fineness of the warp threads in the central region.

20. The seat-belt strap as claimed in claim 1, wherein an alternation of 1/2 twill weave and 2/1 twill weave is provided across the width of the at least one selvage region.

21. The seat-belt strap as claimed in claim 11, wherein the 1/2 twill weave and the 2/1 twill weave alternate after every warp thread.

22. A method of forming a seat-belt strap for a seat-belt system of a motor vehicle wherein a woven fabric is formed from warp threads and weft threads, wherein the seat-belt strap is woven with a 1/2 twill weave and a 2/1 twill weave such that the woven construction of the seat-belt strap alternates across at least part of its width between a 1/2 twill weave and a 2/1 twill weave.

* * * * *